(12) United States Patent
Kruempelmann et al.

(10) Patent No.: US 12,197,460 B2
(45) Date of Patent: Jan. 14, 2025

(54) TRANSPORT OF MASTER DATA DEPENDENT CUSTOMIZATIONS

(71) Applicant: SAP SE, Walldorf (DE)

(72) Inventors: Wulf Kruempelmann, Altlussheim (DE); Susanne Schott, Walldorf (DE)

(73) Assignee: SAP SE, Walldorf (DE)

( * ) Notice: Subject to any disclaimer, the term of this patent is extended or adjusted under 35 U.S.C. 154(b) by 199 days.

(21) Appl. No.: 17/452,331

(22) Filed: Oct. 26, 2021

(65) Prior Publication Data

US 2023/0126702 A1   Apr. 27, 2023

(51) Int. Cl.
*G06F 16/25* (2019.01)
*G06F 16/21* (2019.01)
*G06F 16/2453* (2019.01)
*H04L 67/00* (2022.01)

(52) U.S. Cl.
CPC .......... *G06F 16/258* (2019.01); *G06F 16/213* (2019.01); *G06F 16/2453* (2019.01); *H04L 67/34* (2013.01)

(58) Field of Classification Search
CPC .. G06F 16/258; G06F 16/213; G06F 16/2453; H04L 67/34
See application file for complete search history.

(56) References Cited

U.S. PATENT DOCUMENTS

| | | | |
|---|---|---|---|
| 8,365,138 B2 * | 1/2013 | Iborra | G06F 16/2365 717/113 |
| 10,565,094 B1 * | 2/2020 | Schaude | G06F 16/2282 |
| 2009/0164970 A1 * | 6/2009 | Gentry | G06F 8/71 717/101 |
| 2020/0089792 A1 * | 3/2020 | Packirisamy | G06F 16/2365 |
| 2020/0159524 A1 * | 5/2020 | Kruempelmann | G06F 8/71 |

* cited by examiner

*Primary Examiner* — Allen S Lin
(74) *Attorney, Agent, or Firm* — Mintz Levin Cohn Ferris Glovsky and Popeo, P.C.

(57) ABSTRACT

A method, a system, and a computer program product for transporting master data dependent configuration data for execution of a transaction. A request to import a transaction data from a first computing system to a second computing system is received. The transaction data is associated with execution of a transaction by the second computing system. Based on the received request, a determination that a first type of data is required for execution of the transaction by the second system. The first type of data includes one or more keys identifying dependencies of the first type of data on a second type of data. One or more transport objects for transporting the transaction data from the first to the second system are generated. The transaction data identifies the first and second types of data and the keys. The transaction is executed using the transport objects imported to the second system.

15 Claims, 8 Drawing Sheets

TRANSPORT OF MASTER DATA DEPENDENT CUSTOMIZATIONS

TECHNICAL FIELD

This disclosure relates generally to data processing and, in particular, to transporting of master data dependent customized data structures in computing systems.

BACKGROUND

Database management systems have become an integral part of many computer systems. For example, some systems handle hundreds if not thousands of transactions per second. On the other hand, some systems perform very complex multidimensional analysis on data. In both cases, the underlying database may need to handle responses to queries very quickly in order to satisfy systems requirements with respect to transaction time. Data stored by such systems may be stored using various schemas. Such data may be stored in tables, some of which may periodically be updated. Given the complexity of customizations to data structures, their dependencies on various other data (e.g., master data), the underlying databases face challenges in order to optimize performance and provide access to data.

SUMMARY

In some implementations, the current subject matter relates to a computer implemented method for transporting master data dependent configuration data for execution of a transaction. The method may include receiving a request to import a transaction data from a first computing system to a second computing system. The transaction data may be associated with execution of a transaction in a plurality of transactions by the second computing system. The first computing system may store a plurality of types of data. The method may further include determining, based on the received request, a first type of data in the plurality of types of data required for execution of the transaction by the second computing system. The first type of data may include one or more keys identifying one or more dependencies of the first type of data on a second type of data in the plurality of types of data. One or more transport objects for transporting the transaction data from the first computing system to the second computing system may be generated. The transaction data may identify the first type of data, the second type of data, and one or more keys. The method may also include importing the generated transport objects from the first computing system to the second computing system, and executing, using the imported transport objects, the transaction.

In some implementations, the current subject matter may include one or more of the following optional features. The first computing system may be a development computing system. The second computing system may be a production computing system.

In some implementations, the first type of data may be a configuration data for configuring execution of the transaction by the second computing system. The first type of data may be stored by one or more first databases of the first computing system. The second type of data may be a master data being stored by one or more second databases of the first computing system. The keys may include one or more foreign key connections between the configuration data and the master data.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
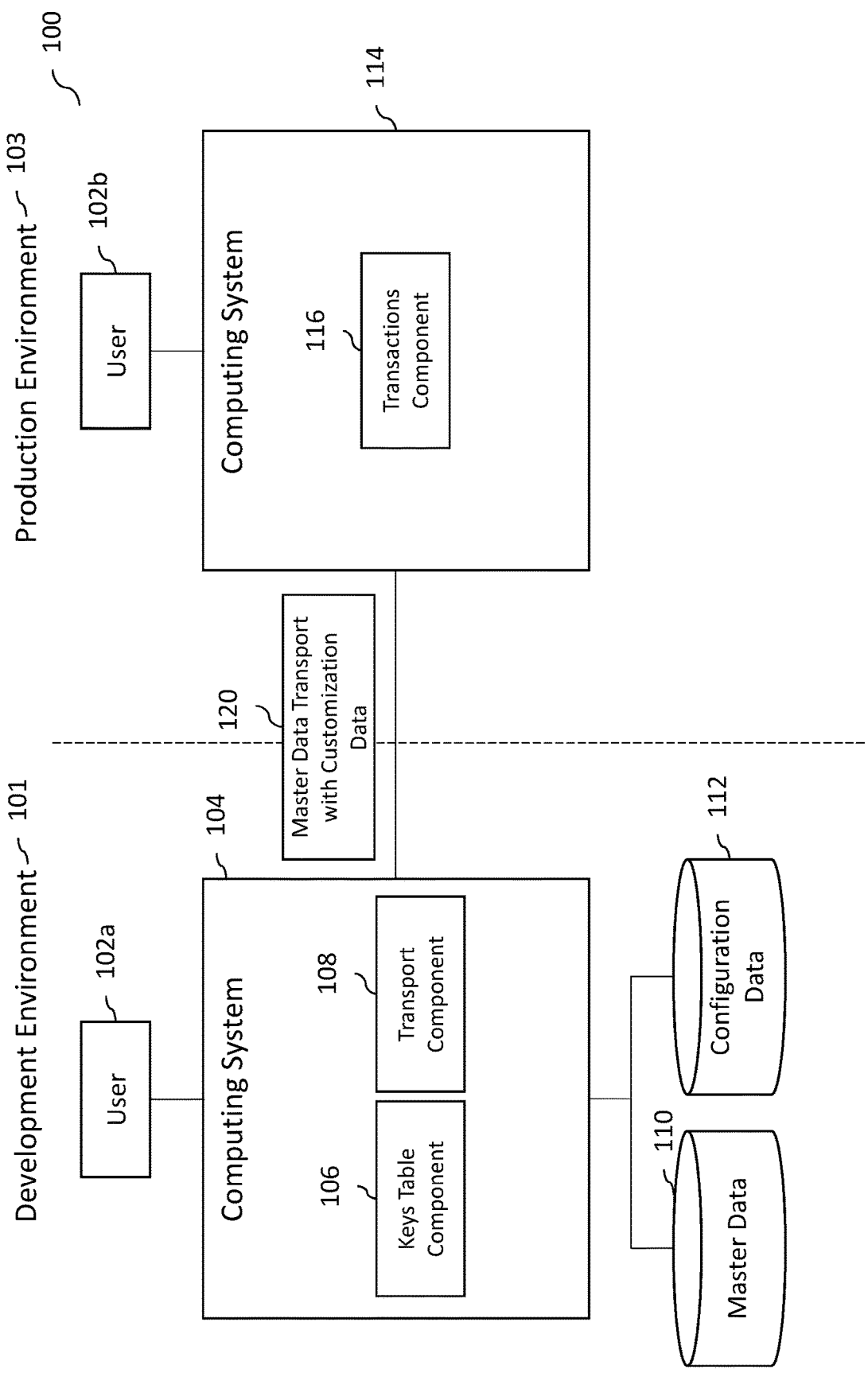
FIG. 1 illustrates an exemplary system for transporting of master data dependent customizations in computing systems, according to some implementations of the current subject matter.

To address the deficiencies of currently available solutions, one or more implementations of the current subject matter provide for an ability to transporting of master data dependent customized data structures and/or configurations in computing systems.

Database management systems and operations performed on the data managed by a database management system have become increasingly complex. For example, a database management systems (or database for short) may support relatively complex online analytical processing (OLAP, which may perform multi-dimensional analysis) to more straightforward transaction-based online transaction processing (OLTP). Moreover, the database may be configured as a row store database or column store database, each of which may have certain aspects with respect to queries and other operations at the database. For example, the database may encode data using dictionaries, while some databases may not. In addition to these various databases layer differences, the queries performed at a database may include a complex sequence of operations in order to generate corresponding responses. To implement the complex sequence, a query execution plan (or query plan for short) may be implemented. The query plan may represent a sequence of operations, such as instructions, commands, and/or the like, to access data in the database. The database may also include a query plan optimizer to determine an efficient way to execute the query plan.

From an application or client perspective, it may be extremely cumbersome to access databases. For example, an application may need to query different types of databases using complex queries. As a consequence, the application layer may need to be configured to handle the various types of databases and various query types. Additionally or alternatively, each database may need to process queries from the application into a format and structure that can be handled by the given database. Pushing complex operations and support for a variety of different database types to the application layer may contravene the need to have relatively lighter weight and/or readily deployable applications. On the other hand, pushing complex operations to the database layer where data is stored may draw processing and/or memory resources at the database and may thus reduce the performance and response times for queries on that database layer.

File storage and/or processing systems may be centralized through the use of one or more servers, which can offload processing and/or storage from client devices accessing the one or more servers. However, although servers may make it easier and/or more convenient for users to store/access data from virtually anywhere, servers may still only have a limited processing and/or storage capacity (e.g., a server or set of servers may only be able to process so many things at one time without degrading performance). Hence, owners/operators of servers may wish to optimize processing procedures performed at the servers.

In various computing systems, such as enterprise resource planning (ERP) systems, data processing, execution of transactions, querying, and various other operations depend on access and/or use of various data. Such data may include master data which may be required for performing of a specific operations (e.g., execution of a transaction). Periodically, when performing an operation in such computing systems, various data, rules, applications, etc. may need to be customized and/or specifically configured to fit a particular need. For example, specific payment rules may be applied in connection with various accounts (which may, in turn, constitute master data). Such customization/configuration data, rules, applications, etc. may be separately developed and/or tested during a development process of the computing system (e.g., in a development environment). Moreover, the customization/configuration data may have one or more dependencies on the master data. The development environment is typically separate from the production environment, where various operations, applications, transactions, etc., that have been developed in the development environment, may be executed.

To ensure execution of customized/configured operations, applications, transactions, etc. in the production environment, the customization/configuration data may be transported from the development environment to the production environment and may be called on during execution (e.g., it may be stored in a storage location that may be accessed by operations, applications, transactions, etc. that are being executed). However, periodically, the master data that has been used during development is not transported to the production environment, which may cause errors, require users of the computing system to import and/or maintain such master data manually, and/or cause various other issues.

In some implementations, to ensure that appropriate required master data is transported along with the customization/configuration data from the development environment to the production environment, the current subject matter may be configured to check whether a transport of the customization/configuration data includes such master data. In particular, the current subject matter may be configured to scan a transport request identifying the customization/configuration data to determine whether one or more portions of master data may be required. One or more foreign key connections may be used for the scanning of transport requests.

A foreign key may be configured to one or more relationships between tables (e.g., in a dictionary), generate value checks for input fields and/or link one or more tables in a view and/or a lock object. A foreign key may be configured to link one or more tables by assigning fields of one table to one or more primary key fields of another table. One of the tables may be referred to as a foreign key table (e.g., a dependent table) and another table may be referred to as a check table (e.g., a referenced table). One field of the foreign key table may be configured to correspond to each key field of the check table, which may be referred to as a foreign key field (the fields for the two tables have the same data type and length). Further, a foreign key may be configured to allow assignment of data records in the foreign key table and the check table. Using entries in the foreign key fields, one record of the foreign key table may be configured to uniquely identify one record of the check table. To perform a check of the field and a value, one of the foreign key fields may be marked as the check field, where a foreign key relationship may be maintained for this field. When an entry in the check field is made, the system checks whether the check table includes a record with the key defined by the values in the foreign key fields. If such record exists, the entry is valid, otherwise the entry is rejected.

In some implementations, the current subject matter may be configured to determine whether a foreign key connection is satisfied in the production environment. If it is not, one or more of the following possibilities may exist. One of the possibilities may be that the master data is being transported in the same transport response as the customization/configuration data. Alternatively, the master data values may be part of a particular table that cannot be altered (e.g., marked as "Not to be tested") and as such, the missing master data may be ignored.

However, if an error is generated based on the foreign key connection check, the current subject matter may be configured to generate a transport response that may include a table that may include identification information associated with the customization/configuration data (e.g., a name of the customization/configuration data), identification information associated with the master data (e.g., name of the master data) to which the customization/configuration data may be linked, and identification of a particular operation (e.g., transaction, application, etc.) that may be executed in the production environment and that may need access to the master date by virtue of use of the customization/configuration data. The transport response may include any additional information/data that may be needed by the execution of the identified operation in the production environment.

In some implementations, the current subject matter may be configured to generate an additional transport request/response that may include the above table with the identification of the customization/configuration data, master data, and the identified operation. Further, the additional transport request/response may be configured to include any missing foreign key information that may be needed to link the customization/configuration data, the master data, and/or the identified operation.

When execution of the identified operation is initiated in the production environment, the production environment computing system may be configured to determine that additional information may be required for the purposes of executing the identified operation. The production environment computing system may the import the required data (e.g., customization/configuration data, the master data, etc.). The system may then read the imported data and execute the identified operation.

FIG. 1 illustrates an exemplary system 100 for transporting of master data dependent customizations in computing systems, according to some implementations of the current subject matter. The system 100 may be configured to operate in one or more database system environments, cloud computing environments, clustered computing environments (e.g., Kubernetes), and/or any other computing environments. The system 100 may be configured to include a development environment 101 and a production environment 103. In the development environment 101, one or more applications, operations, etc. may be developed for executing one or more associated operations, transactions, etc. in the production (or "live") environment 103.

The development environment 101 may include one or more users, entities, applications, etc. 102a, a computing system 104, a master data database 110 and a configuration data database 112. The system 104 may include one or more keys table components 106 and one or more transport components 108, as well as various other components. The master data database 110 may be configured to store various master data that may be required for execution of one or more operations in the production environment 103. The configuration data database 112 may be configured to store various customization/configuration data that may also be needed for execution of various specific operations in the production environment 103.

The production environment 103 may include one or more users, entities, applications, etc. 102b (which may or may not be the same as users 102a) and a computing system 114 (which may be a production version of the system 104). The system 114 may include one or more transactions components 116 as well as various other components. The transactions components 116 may be configured to execute one or more operations, transactions, etc. that may rely on data from one or more of the master data databases 110 and/or the configuration data database 112.

The computing systems 104, 114 may include a processor, a memory, and/or any combination of hardware/software, and may be configured to perform an update to data structures. Components of the system 100 may be communicatively coupled using one or more communications networks. The communications networks can include at least one of the following: a wired network, a wireless network, a metropolitan area network ("MAN"), a local area network ("LAN"), a wide area network ("WAN"), a virtual local area network ("VLAN"), an internet, an extranet, an intranet, and/or any other type of network and/or any combination thereof.

The components of the system 100 may include any combination of hardware and/or software. In some implementations, the components may be disposed on one or more computing devices, such as, server(s), database(s), personal computer(s), laptop(s), cellular telephone(s), smartphone(s), tablet computer(s), and/or any other computing devices and/or any combination thereof. In some implementations, the components may be disposed on a single computing device and/or can be part of a single communications network. Alternatively, the components may be separately located from one another.

The databases 110, 112 may be used to store various data arranged in one or more tables. The stored data may be modified and/or updated, by way of a non-limiting example, through one or more data manipulation language (DML) processes, which may include one or more operations, including but not limited to, INSERT (e.g., insertion of data into an existing data at a predetermined offset or location), UPDATE (e.g., modification of stored data), and DELETE (e.g., deletion of stored data). Additionally, for example, the stored data may be affected using various data definition language (DDL) statements, which may include creation of various schema for data storage. In some implementations, the databases 110, 112 may include one or more servers, processors, memory locations, cloud computing components/systems, etc. that may be used for accessing data. In some implementations, the databases 110, 112 may be a HANA Database system, as developed by SAP SE, Walldorf, Germany, as will be described below (HANA was previously known as High-Performance Analytic Appliance).

The database table(s) of the databases 110, 112 may include at least one column, which may be accessed by the system 104 and/or system 114. The database table(s) may store any kind of data. For example, the data may include, but is not limited to, definitions of business scenarios, business processes, and one or more business configurations as well as transactional data, metadata, master data, etc. relating to instances or definitions of the business scenarios, business processes, and one or more business configurations, and/or concrete instances of data objects and/or business objects that are relevant to a specific instance of a business scenario, business process, and/or the like.

In some implementations, the system 100 (and/or any portion thereof) may be implemented as a cloud-based database management system. A cloud-based database management system may be a hardware and/or software system for receiving, handling, optimizing, and/or executing various queries. The databases 110, 112 may be a structured, organized collection of data, such as schemas, tables, queries, reports, views, and/or the like, which may be processed for information. Further, the databases 110, 112 may be physically stored in a hardware server or across a plurality of hardware servers. A cloud-based database management system may be a hardware and/or software system that interacts with a database, document store, users, and/or other software applications for defining, creating, and/or updating data, for receiving, handling, optimizing, and/or executing database queries, and/or for running applications which utilize the databases 110, 112.

Figure 2:
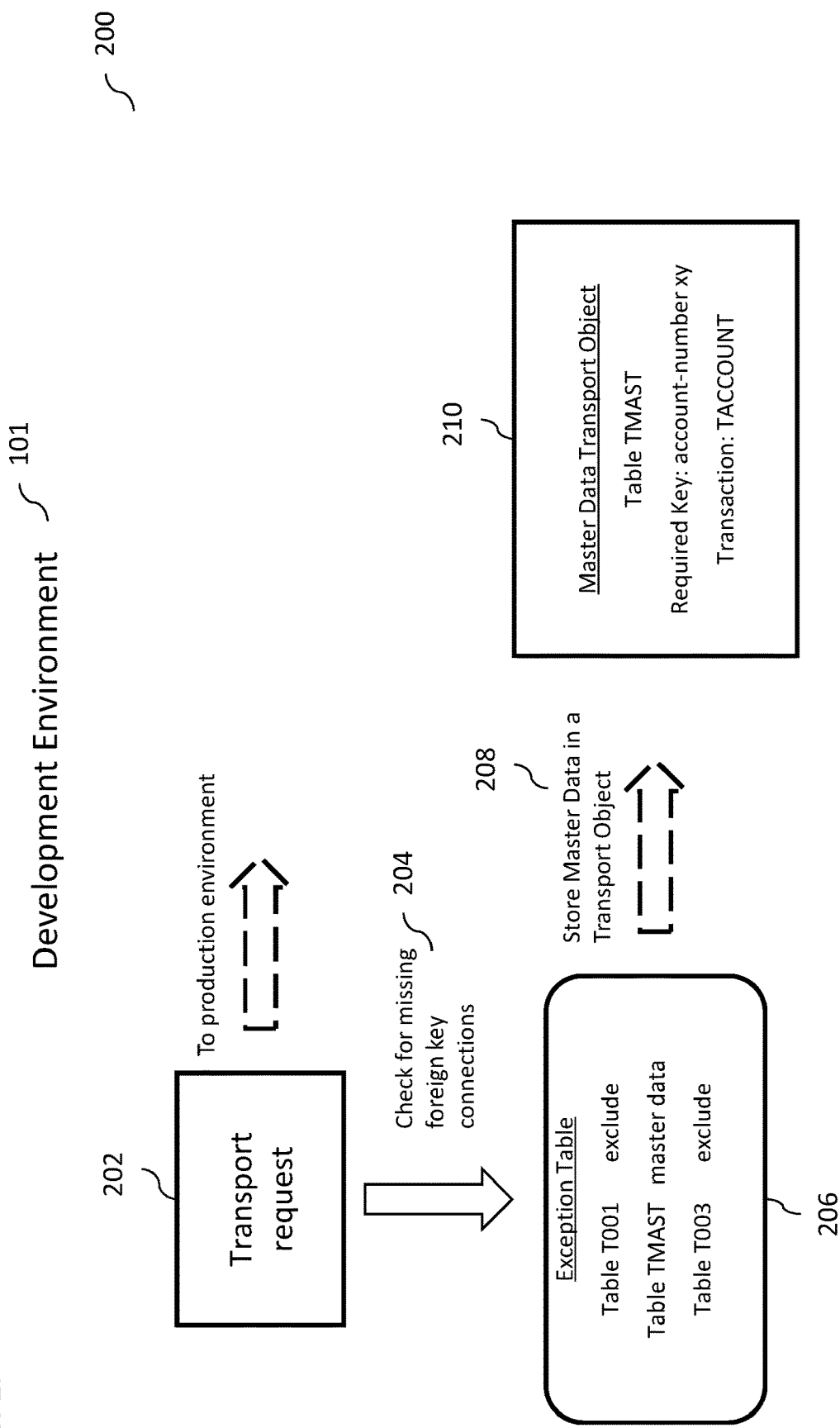
FIG. 2 illustrates an exemplary development environment for transporting master data dependent configuration/customization data to production environment, according to some implementations of the current subject matter.

FIG. 2 illustrates an exemplary development environment 101 for transporting master data dependent configuration/customization data to production environment 103, according to some implementations of the current subject matter. In some implementations, the system 104 (as shown in FIG. 1) may be configured to receive a transport request 202 (e.g., from the production system 114, users 102*a*, 102*b*, etc.) for transmitting data to the production environment 103. In particular, the transport request 202 may indicate that certain data may be needed for execution of an operation (e.g., transaction, etc.) in the production system 114 (as shown in FIG. 1). The data that may be needed may include certain configuration data that may be stored in the configuration data database 112 and that may depend on the master data that may be stored in the master data database 110.

Upon receiving of the transport request 202, the system 104 may be configured to check, at 204, the request 202 to determine whether there are any missing foreign key connections between the configuration data (as stored in the database 112) and the master data (as stored in the database 110) that may be required for execution of a transaction in the production environment. If missing foreign key connection(s) between configuration and master data are found, the system 104 may be configured to generate an exception table 206 that may indicate that certain master data table ("TMAST") may be required and that certain tables may be needed and/or may need to be excluded (e.g., Table T001, Table T003). The system 104 may query the databases 110 and 112 to retrieve appropriate data and prepare it for transporting it to the production system 114.

At 208, the system 104 may be configured to generate a master data transport object 210 (using the data it retrieved from databases 110, 112) and store the master data in the table TMAST in the object 210. The object 210 may also store information about required foreign key connection (e.g., "account-number xy") that may connect the master data (as stored in the master data database 110) with the configuration data (as stored in the configuration data database 112) that may be associated and/or required by a particular operation to be executed by in the production environment 103 by the system 114. The object 210 may also identify the specific operation, transaction, etc. (e.g., "TACCOUNT") that may require the master data (TMAST). The transport object 120 may be transmitted to (e.g., imported into) the production environment 103 by way of a master data transport with customization object 120 (as shown in FIG. 1) and/or as a separate object. The object 210 may be temporarily and/or permanently stored at a storage location in the development system 104.

Figure 3:
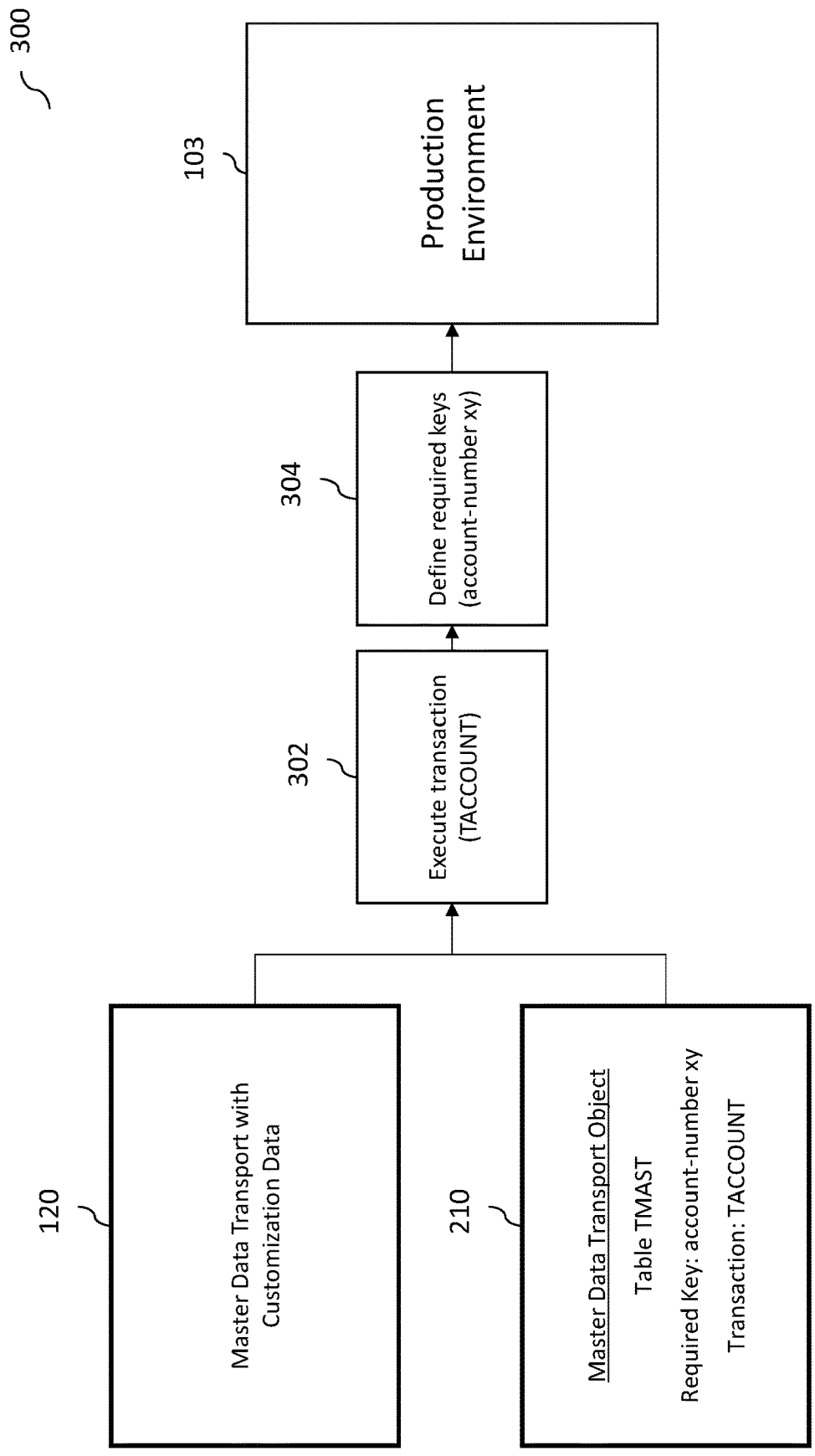
FIG. 3 illustrates an exemplary importation process for importing master data transport object and/or the transport response into the production environment, according to some implementations of the current subject matter.

FIG. 3 illustrates an exemplary importation process 300 for importing master data transport object 210 and/or the transport response 120 into the production environment 103, according to some implementations of the current subject matter. As shown in FIG. 3, the objects 210 (i.e., a master data transport object) and master data transport with customization data object 120 may be transported to the production environment 103. As can be understood, the objects 120 and 210 may be separate objects and/or single object that may be generated as part of a response to the transport request.

Once transport of the objects 120, 210 is initiated, execution 302 of the transaction (e.g., TACCOUNT) identified in the master data transport object 210 may be initiated. Along with initiation of the execution of the identified transaction, the required foreign keys (e.g., account-number xy) may be defined, at 304. The identified transaction is then executed by the system 114 (shown in FIG. 1) of the production environment 103. During the execution, the identified transaction may access the objects 120, 210 for the required master data and/or the configuration data. The objects 120, 210 may be temporarily stored by the production environment system 114.

Figure 4:
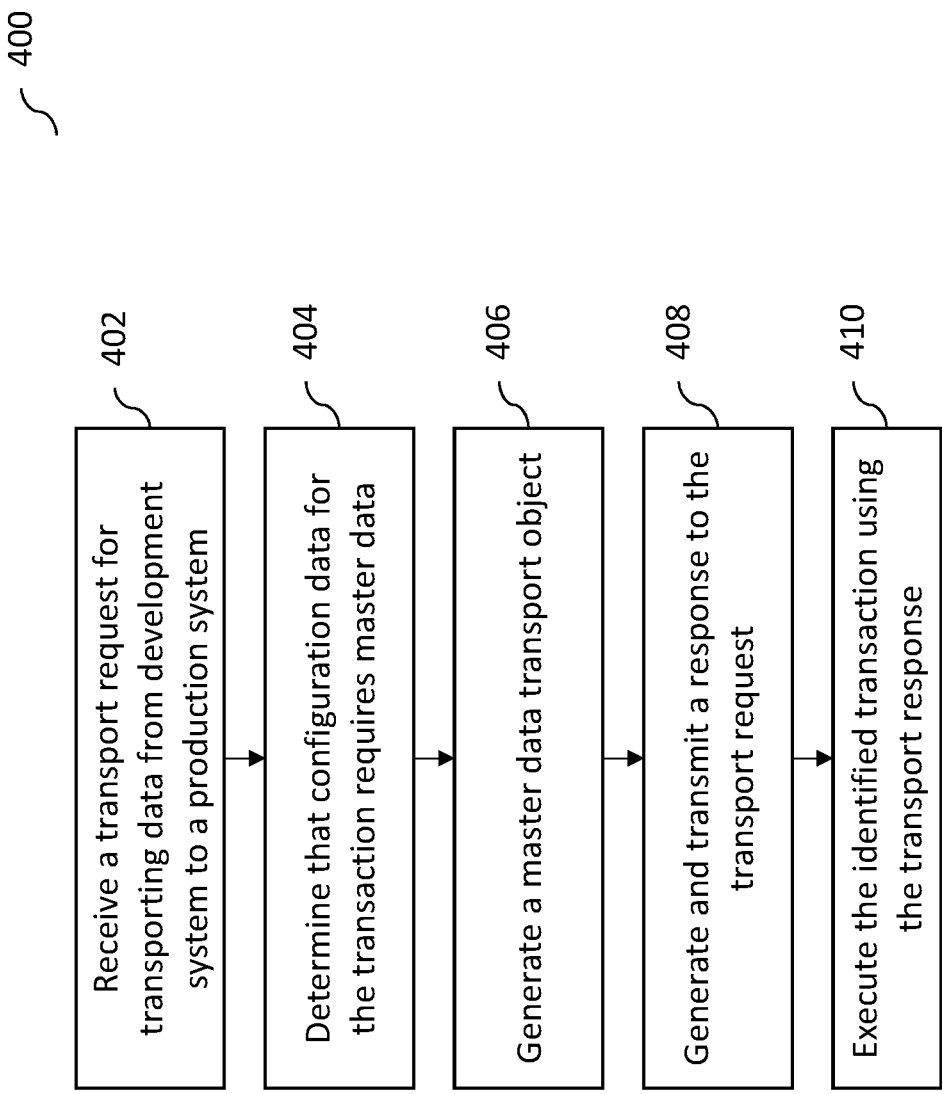
FIG. 4 illustrates an exemplary process for transporting data from a development environment system to a production environment system, according to some implementations of the current subject matter.

FIG. 4 illustrates an exemplary process 400 for transporting data from a development environment system to a production environment system, according to some implementations of the current subject matter. The process 400 may be executed using the systems 100 shown in FIG. 1. The development environment system may be system 104 and the production environment system may be system 114 as shown in FIG. 1.

At 402, a request to transport data from system 104 to system 114 may be received. The request may identify a particular operation, transaction, etc. that is to be executed in the system 114 and request data associated with execution thereof.

At 404, a determination may be made by the system 104 that configuration data (e.g., stored in the configuration data database 112) for the same may require and/or be dependent on master data (e.g., stored in the master data database 110). The determination may be made by checking the received transport request to determine whether one or more foreign keys connections associated with the configuration data may be missing. The missing key connections may be indicative that specific master data may be required for execution of the identified transaction. As can be understood, any other ways of determining missing master data may be used.

At 406, a master data transport object (e.g., object 210 shown in FIG. 2) may be generated using the identified missing key connections. The master data transport object may include information concerning the required master data, the configuration data, including any information connecting the master data and the configuration data (i.e., missing key connections) as well as the identified transaction.

At 408, a response (e.g., object 12) to the transport request may be generated and transmitted to production environment system 114. The response may include the master data transport object as well any other data, information, etc. At 410, the identified transaction may be executed using the information (i.e., objects 120, 210) imported from the development environment system.

In some implementations, the current subject matter can be implemented in various in-memory database systems, such as the HANA Database system as developed by SAP SE, Walldorf, Germany. Various systems, such as, enterprise resource planning ("ERP") system, supply chain management system ("SCM") system, supplier relationship management ("SRM") system, customer relationship management ("CRM") system, and/or others, can interact with the in-memory system for the purposes of accessing data, for example. Other systems and/or combinations of systems can be used for implementations of the current subject matter. The following is a discussion of an exemplary in-memory system.

Figure 5:
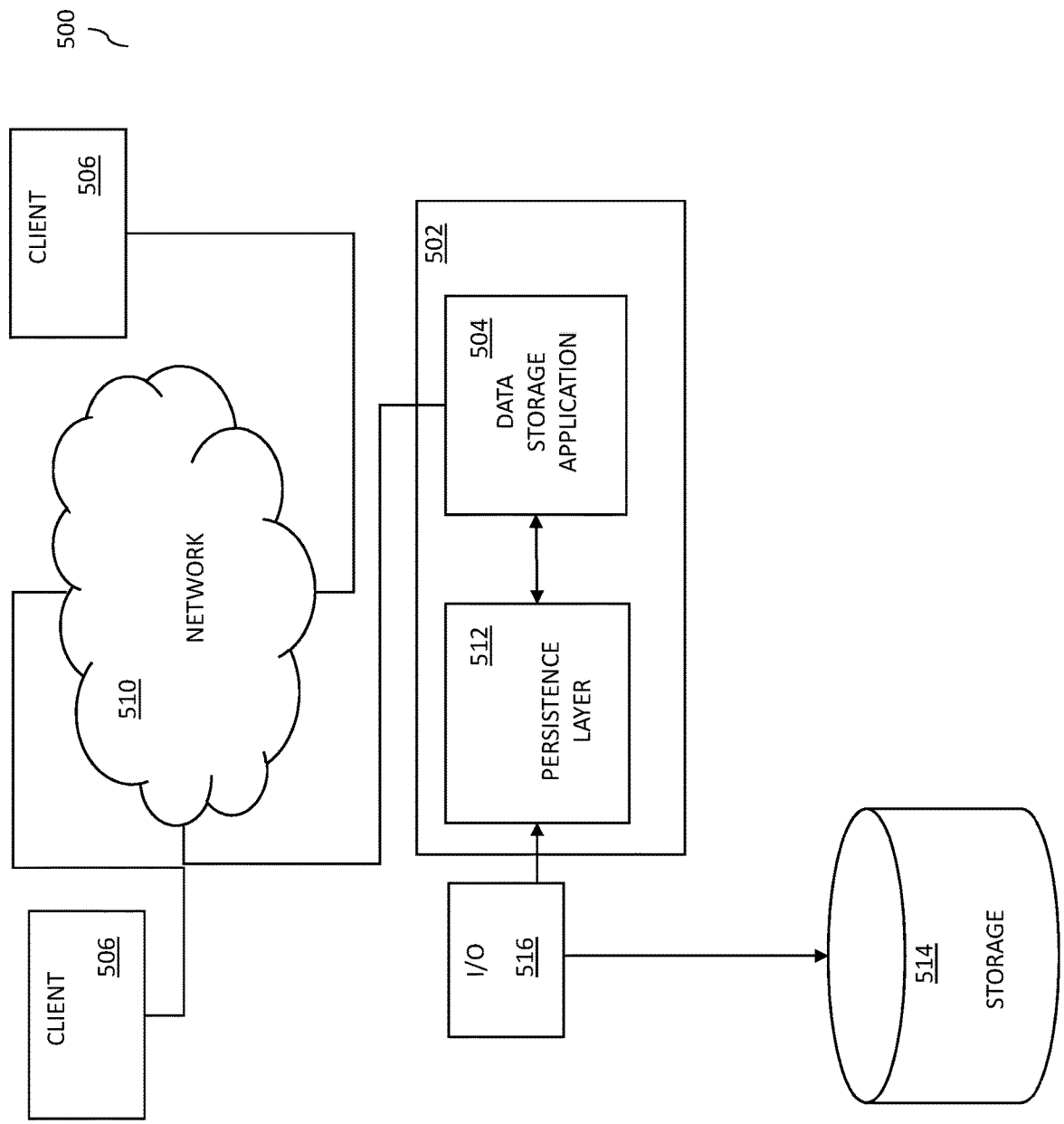
FIG. 5 is a diagram illustrating an exemplary system including a data storage application, according to some implementations of the current subject matter.

FIG. 5 illustrates an exemplary system 500 in which a computing system 502, which can include one or more programmable processors that can be collocated, linked over one or more networks, etc., executes one or more modules, software components, or the like of a data storage application 504, according to some implementations of the current subject matter. The data storage application 504 can include one or more databases, an enterprise resource program, a distributed storage system (e.g. NetApp Filer available from NetApp of Sunnyvale, CA), or the like.

The one or more modules, software components, or the like can be accessible to local users of the computing system 502 as well as to remote users accessing the computing system 502 from one or more client machines 506 over a network connection 510. One or more user interface screens produced by the one or more first modules can be displayed to a user, either via a local display or via a display associated with one of the client machines 506. Data units of the data storage application 504 can be transiently stored in a persistence layer 512 (e.g., a page buffer or other type of temporary persistency layer), which can write the data, in the form of storage pages, to one or more storages 514, for example via an input/output component 516. The one or more storages 514 can include one or more physical storage media or devices (e.g. hard disk drives, persistent flash memory, random access memory, optical media, magnetic media, and the like) configured for writing data for longer term storage. It should be noted that the storage 514 and the input/output component 516 can be included in the computing system 502 despite their being shown as external to the computing system 502 in FIG. 5.

Data retained at the longer-term storage 514 can be organized in pages, each of which has allocated to it a defined amount of storage space. In some implementations, the amount of storage space allocated to each page can be constant and fixed. However, other implementations in which the amount of storage space allocated to each page can vary are also within the scope of the current subject matter.

Figure 6:
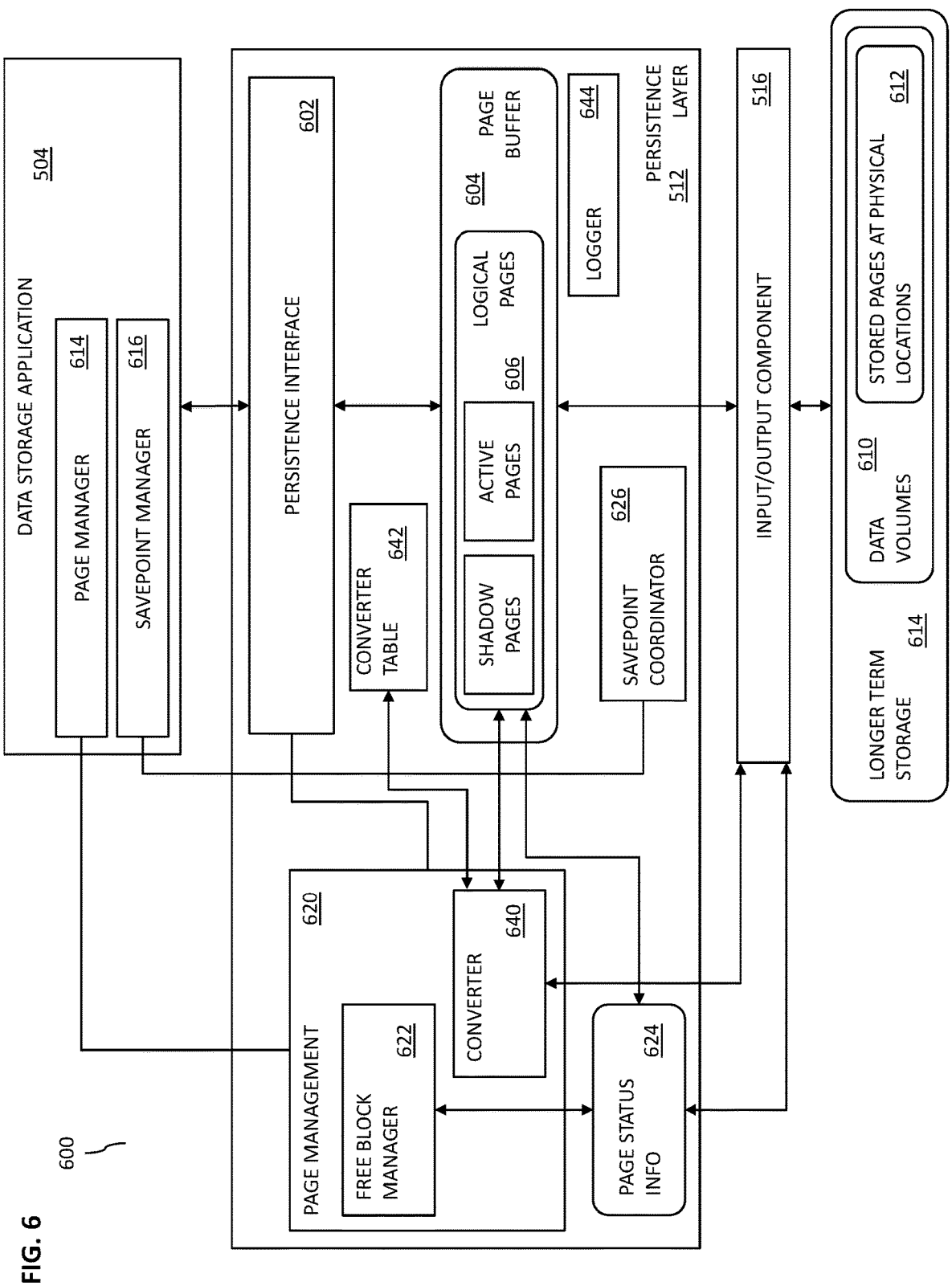
FIG. 6 is a diagram illustrating details of the system of FIG. 5.

FIG. 6 illustrates exemplary software architecture 600, according to some implementations of the current subject matter. A data storage application 504, which can be implemented in one or more of hardware and software parts, can include one or more database applications, a network-attached storage system, or the like. According to at least some implementations of the current subject matter, such a data storage application 504 can include or otherwise interface with a persistence layer 512 or other type of memory buffer, for example via a persistence interface 602. A page buffer 604 within the persistence layer 512 can store one or more logical pages 606, and optionally can include shadow pages, active pages, and the like. The logical pages 606 retained in the persistence layer 512 can be written to a storage (e.g. a longer term storage, etc.) 514 via an input/output component 516, which can be a software module, a sub-system implemented in one or more of software and hardware, or the like. The storage 514 can include one or more data volumes 610 where stored pages 612 are allocated at physical memory blocks.

In some implementations, the data storage application 504 can include or be otherwise in communication with a page manager 614 and/or a save point manager 616. The page manager 614 can communicate with a page management module 620 at the persistence layer 512 that can include a free block manager 622 that monitors page status information 624, for example the status of physical pages within the storage 514 and logical pages in the persistence layer 512 (and optionally in the page buffer 604). The save point manager 616 can communicate with a save point coordinator 626 at the persistence layer 512 to handle save points, which are used to create a consistent persistent state of the database for restart after a possible crash.

In some implementations of a data storage application 504, the page management module of the persistence layer 512 can implement a shadow paging. The free block manager 622 within the page management module 620 can maintain the status of physical pages. The page buffer 604 can include a fixed page status buffer that operates as discussed herein. A converter component 640, which can be part of or in communication with the page management module 620, can be responsible for mapping between logical and physical pages written to the storage 514. The converter 640 can maintain the current mapping of logical pages to the corresponding physical pages in a converter table 642. The converter 640 can maintain a current mapping of logical pages 606 to the corresponding physical pages in one or more converter tables 642. When a logical page 606 is read from storage 514, the storage page to be loaded can be looked up from the one or more converter tables 642 using the converter 640. When a logical page is written to storage 514 the first time after a save point, a new free physical page is assigned to the logical page. The free block manager 622 marks the new physical page as "used" and the new mapping is stored in the one or more converter tables 642.

The persistence layer 512 can ensure that changes made in the data storage application 504 are durable and that the data storage application 504 can be restored to a most recent committed state after a restart. Writing data to the storage 514 need not be synchronized with the end of the writing transaction. As such, uncommitted changes can be written to disk and committed changes may not yet be written to disk when a writing transaction is finished. After a system crash, changes made by transactions that were not finished can be rolled back. Changes occurring by already committed transactions should not be lost in this process. A logger component 644 can also be included to store the changes made to the data of the data storage application in a linear log. The logger component 644 can be used during recovery to replay operations since a last save point to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations can occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information can be written by the logger component 644 whenever a change is made. This information can be written to disk at latest when the transaction ends. The log entries can be persisted in separate log volumes while normal data is written to data volumes. With a redo log, committed changes can be restored even if the corresponding data pages were not written to disk. For undoing uncommitted changes, the persistence layer 512 can use a combination of undo log entries (from one or more logs) and shadow paging.

The persistence interface 602 can handle read and write requests of stores (e.g., in-memory stores, etc.). The persistence interface 602 can also provide write methods for writing data both with logging and without logging. If the logged write operations are used, the persistence interface 602 invokes the logger 644. In addition, the logger 644 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 644. For an entry of type "update", for example, this would be the identification of the affected record and the after image of the modified data.

When the data application 504 is restarted, the log entries need to be processed. To speed up this process the redo log is not always processed from the beginning. Instead, as stated above, save points can be periodically performed that write all changes to disk that were made (e.g., in memory, etc.) since the last save point. When starting up the system, only the logs created after the last save point need to be processed. After the next backup operation, the old log entries before the save point position can be removed.

When the logger 644 is invoked for writing log entries, it does not immediately write to disk. Instead, it can put the log entries into a log queue in memory. The entries in the log queue can be written to disk at the latest when the corresponding transaction is finished (committed or aborted). To guarantee that the committed changes are not lost, the commit operation is not successfully finished before the corresponding log entries are flushed to disk. Writing log queue entries to disk can also be triggered by other events, for example when log queue pages are full or when a save point is performed.

With the current subject matter, the logger 644 can write a database log (or simply referred to herein as a "log") sequentially into a memory buffer in natural order (e.g., sequential order, etc.). If several physical hard disks/storage devices are used to store log data, several log partitions can be defined. Thereafter, the logger 644 (which as stated above acts to generate and organize log data) can load-balance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. However, the log buffers can be reordered from log segments of all partitions during recovery to the proper order.

As stated above, the data storage application 504 can use shadow paging so that the save point manager 616 can write a transactionally consistent save point. With such an arrangement, a data backup comprises a copy of all data pages contained in a particular save point, which was done as the first step of the data backup process. The current subject matter can be also applied to other types of data page storage.

Figure 7:
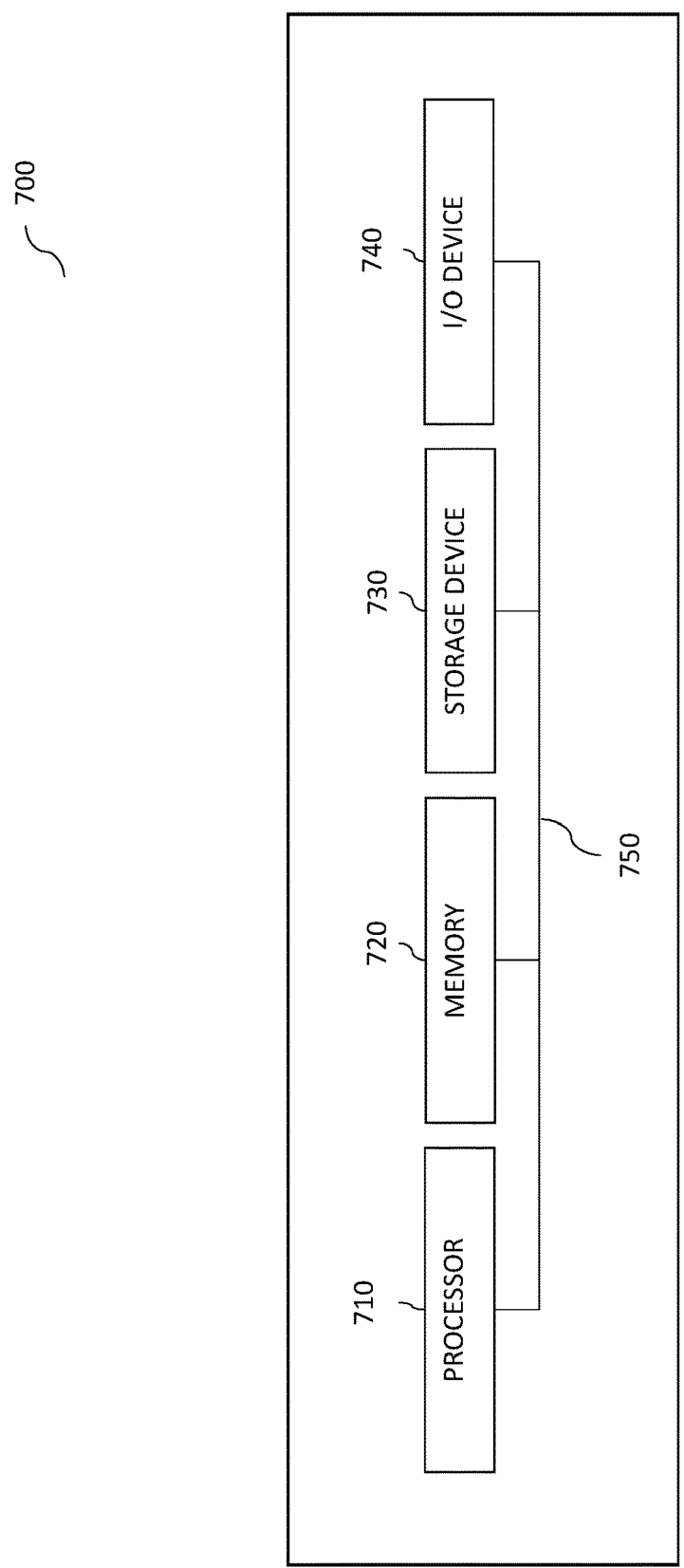
FIG. 7 illustrates an exemplary system, according to some implementations of the current subject matter.

In some implementations, the current subject matter can be configured to be implemented in a system 700, as shown in FIG. 7. The system 700 can include a processor 710, a memory 720, a storage device 730, and an input/output device 740. Each of the components 710, 720, 730 and 740 can be interconnected using a system bus 750. The processor 710 can be configured to process instructions for execution within the system 700. In some implementations, the processor 710 can be a single-threaded processor. In alternate implementations, the processor 710 can be a multi-threaded processor. The processor 710 can be further configured to process instructions stored in the memory 720 or on the storage device 730, including receiving or sending information through the input/output device 740. The memory 720 can store information within the system 700. In some implementations, the memory 720 can be a computer-readable medium. In alternate implementations, the memory 720 can be a volatile memory unit. In yet some implementations, the memory 720 can be a non-volatile memory unit. The storage device 730 can be capable of providing mass storage for the system 700. In some implementations, the storage device 730 can be a computer-readable medium. In alternate implementations, the storage device 730 can be a floppy disk device, a hard disk device, an optical disk device, a tape device, non-volatile solid state memory, or any other type of storage device. The input/output device 740 can be configured to provide input/output operations for the system 700. In some implementations, the input/output device 740 can include a keyboard and/or pointing device. In alternate implementations, the input/output device 740 can include a display unit for displaying graphical user interfaces.

Figure 8:
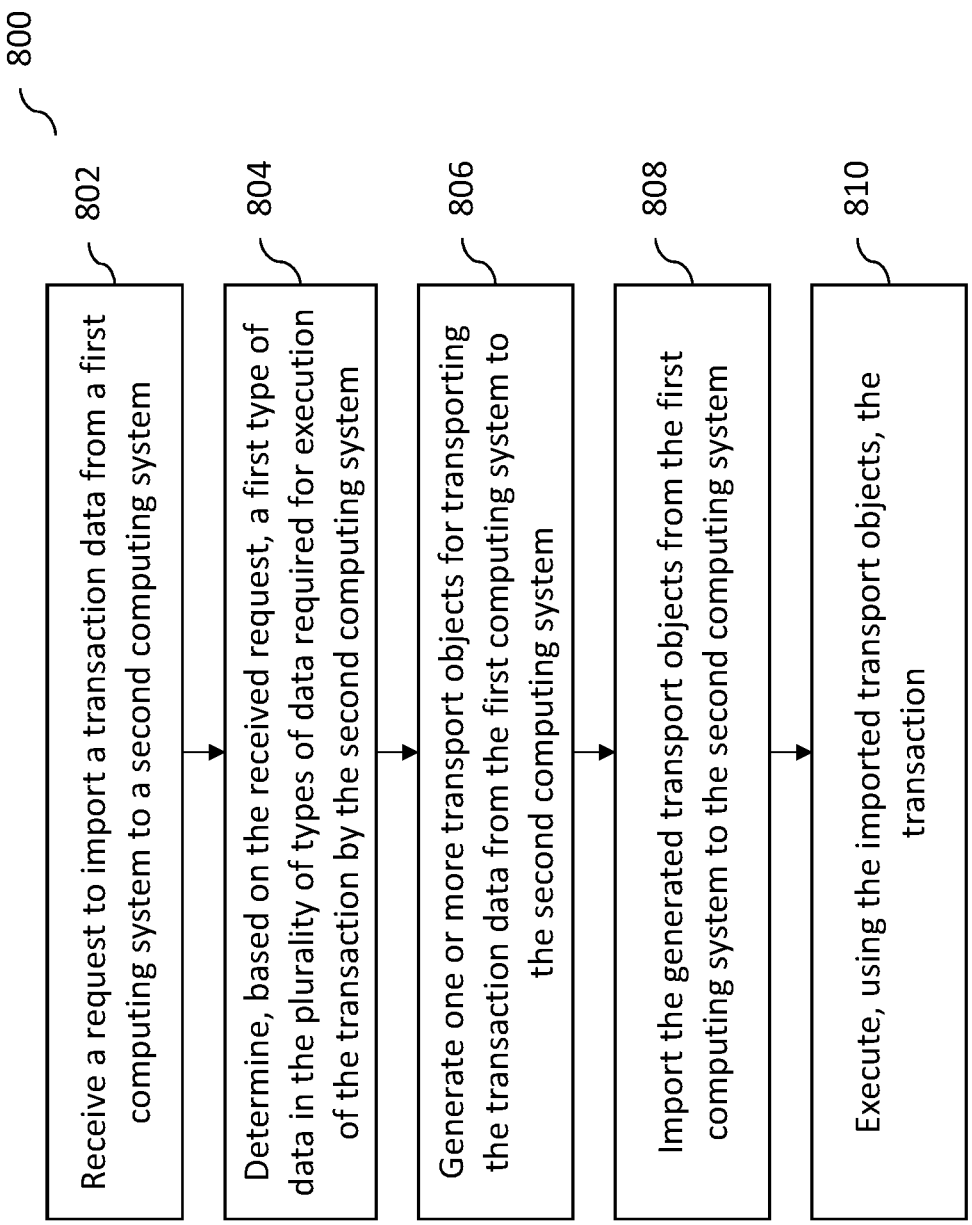
FIG. 8 illustrates an exemplary method, according to some implementations of the current subject matter.

FIG. 8 illustrates an exemplary method 800 for transporting master data dependent configuration data for execution of a transaction, according to some implementations of the current subject matter. The method 800 may be executed by the system 100 (shown in FIG. 1). The method 800 may implement the techniques discussed above in connection with FIGS. 1-6.

At 802, a request (e.g., request 202 as shown in FIG. 2) to import a transaction data from a first computing system (e.g., system 104 as shown in FIG. 1) to a second computing system (e.g., system 114 as shown in FIG. 1) may be received. The transaction data may be associated with execution of a transaction in a plurality of transactions by the second computing system. The first computing system may store a plurality of types of data (e.g., master data, configuration data, etc.).

At 804, a first type of data (e.g., configuration data stored in database 112) in the plurality of types of data required for execution of the transaction by the second computing system may be determined based on the received request. The first type of data may include one or more keys (e.g., foreign key connections) identifying one or more dependencies of the first type of data on a second type of data (e.g., master data stored in database 110) in the plurality of types of data.

At 806, one or more transport objects (e.g., objects 120, 210) for transporting the transaction data from the first computing system to the second computing system may be generated. The transaction data may identify the first type of data, the second type of data, and the one or more keys (as shown in FIG. 2 by the object 210).

At 808, the generated transport objects may be imported (as shown in FIG. 3) from the first computing system to the second computing system. The transaction may be executed (at 302 as shown in FIG. 3) using the imported transport objects.

In some implementations, the current subject matter may include one or more of the following optional features. The first computing system may be a development computing system. The second computing system may be a production computing system.

In some implementations, the first type of data may be a configuration data for configuring execution of the transaction by the second computing system. The first type of data may be stored by one or more first databases (e.g., database 112) of the first computing system. The second type of data may be a master data being stored by one or more second databases (e.g., database 110) of the first computing system. The keys may include one or more foreign key connections between the configuration data and the master data.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random-access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
receiving a request to import transaction data from a first computing system to a second computing system, the transaction data being associated with execution of a transaction in a plurality of transactions by the second computing system, the first computing system storing a plurality of types of data;

determining, based on the received request, a first type of data in the plurality of types of data required for execution of the transaction by the second computing system, wherein the first type of data includes one or more keys identifying one or more dependencies of the first type of data on a second type of data in the plurality of types of data;

determining, based on the received request, whether a foreign key connection is satisfied at the second computing system;

generating, by the first computing system based on the foreign key connection being satisfied, one or more first transport objects for transporting the transaction data from the first computing system to the second computing system, the transaction data identifying the first type of data, the second type of data, and the one or more keys;

generating, by the first computing system in response to the foreign key connection being unsatisfied, a second transport object that includes a table with first identification information associated with first data of the first type, second identification information associated with second data of the second type, third identification information of an operation to be executed by the second computing system, and missing foreign key information to link the first data, the second data, and the operation;

importing the one or more first transport objects and/or the second transport object from the first computing system to the second computing system; and executing, using the imported one or more first transport objects and/or the second transport object, the transaction.

2. The method according to claim 1, wherein the first computing system is a development computing system, and wherein the second computing system is a production computing system.

3. The method according to claim 1, wherein the first type of data is configuration data for configuring execution of the transaction by the second computing system, the first type of data being stored by one or more first databases of the first computing system.

4. The method according to claim 3, wherein the second type of data is master data being stored by one or more second databases of the first computing system.

5. The method according to claim 4, wherein the one or more keys include one or more foreign key connections between the configuration data and the master data.

6. A system comprising:
at least one programmable processor; and
a non-transitory machine-readable medium storing instructions that, when executed by the at least one programmable processor, cause the at least one programmable processor to perform operations comprising:
receiving a request to import transaction data from a first computing system to a second computing system, the transaction data being associated with execution of a transaction in a plurality of transactions by the second computing system, the first computing system storing a plurality of types of data;

determining, based on the received request, a first type of data in the plurality of types of data required for execution of the transaction by the second computing system, wherein the first type of data including one or more keys identifying one or more dependencies of the first type of data on a second type of data in the plurality of types of data;

determining, based on the received request, whether a foreign key connection is satisfied at the second computing system;

generating, by the first computing system based on the foreign key connection being satisfied, one or more first transport objects for transporting the transaction data from the first computing system to the second computing system, the transaction data identifying the first type of data, the second type of data, and the one or more keys;

generating, by the first computing system in response to the foreign key connection being unsatisfied, a second transport object that includes a table with first identification information associated with first data of the first type, second identification information associated with second data of the second type, third identification information of an operation to be executed by the second computing system, and missing foreign key information to link the first data, the second data, and the operation;

importing the one or more first transport objects and/or the second transport object from the first computing system to the second computing system; and executing, using the imported one or more first transport objects and/or the second transport object, the transaction.

7. The system according to claim 6, wherein the first computing system is a development computing system, and wherein the second computing system is a production computing system.

8. The system according to claim 6, wherein the first type of data is configuration data for configuring execution of the transaction by the second computing system, the first type of data being stored by one or more first databases of the first computing system.

9. The system according to claim 8, wherein the second type of data is master data being stored by one or more second databases of the first computing system.

10. The system according to claim 9, wherein the one or more keys include one or more foreign key connections between the configuration data and the master data.

11. A computer program product comprising a non-transitory machine-readable medium storing instructions that, when executed by at least one programmable processor, cause the at least one programmable processor to perform operations comprising:
receiving a request to import transaction data from a first computing system to a second computing system, the transaction data being associated with execution of a transaction in a plurality of transactions by the second computing system, the first computing system storing a plurality of types of data;

determining, based on the received request, a first type of data in the plurality of types of data required for execution of the transaction by the second computing system, wherein the first type of data including one or more keys identifying one or more dependencies of the first type of data on a second type of data in the plurality of types of data;

determining, based on the received request, whether a foreign key connection is satisfied at the second computing system;

generating, by the first computing system based on the foreign key connection being satisfied, one or more first transport objects for transporting the transaction data from the first computing system to the second computing system, the transaction data identifying the first type of data, the second type of data, and the one or more keys;

generating, by the first computing system in response to the foreign key connection being unsatisfied, a second transport object that includes a table with first identification information associated with first data of the first type, second identification information associated with second data of the second type, third identification information of an operation to be executed by the second computing system, and missing foreign key information to link the first data, the second data, and the operation;

importing the one or more first transport objects and/or the second transport object from the first computing system to the second computing system; and executing, using the imported one or more first transport objects and/or the second transport, the transaction.

12. The computer program product according to claim 11, wherein the first computing system is a development computing system, and wherein the second computing system is a production computing system.

13. The computer program product according to claim 11, wherein the first type of data is configuration data for configuring execution of the transaction by the second computing system, the first type of data being stored by one or more first databases of the first computing system.

14. The computer program product according to claim 13, wherein the second type of data is master data being stored by one or more second databases of the first computing system.

15. The computer program product according to claim 14, wherein the one or more keys include one or more foreign key connections between the configuration data and the master data.

* * * * *